(12) United States Patent
Lissotschenko et al.

(10) Patent No.: US 9,446,478 B2
(45) Date of Patent: Sep. 20, 2016

(54) DEVICE FOR APPLYING LASER RADIATION AND DEVICE FOR REPRODUCING A LINEAR LIGHT DISTRIBUTION

(75) Inventors: Vitalij Lissotschenko, Fröndenberg (DE); Aleksei Mikhailov, Dortmund (DE); Nikolai Jeremin, Münster (DE); Yury Kolutushkin, St. Petersburg (RU)

(73) Assignee: LIMO PATENTVERWALTUNG GMBH & CO. KG, Dortmund (DE)

( * ) Notice: Subject to any disclaimer, the term of this patent is extended or adjusted under 35 U.S.C. 154(b) by 934 days.

(21) Appl. No.: 13/634,915

(22) PCT Filed: Mar. 23, 2011

(86) PCT No.: PCT/EP2011/054483
§ 371 (c)(1),
(2), (4) Date: Nov. 13, 2012

(87) PCT Pub. No.: WO2011/117314
PCT Pub. Date: Sep. 29, 2011

(65) Prior Publication Data
US 2013/0056450 A1    Mar. 7, 2013

(30) Foreign Application Priority Data

Mar. 24, 2010   (DE) .................. 10 2010 012 459
Mar. 24, 2010   (DE) .................. 10 2010 012 467
May 14, 2010    (DE) .................. 10 2010 020 498

(51) Int. Cl.
*B23K 26/06*    (2014.01)
*B23K 26/00*    (2014.01)

(52) U.S. Cl.
CPC ....... *B23K 26/0604* (2013.01); *B23K 26/0006* (2013.01); *B23K 2203/00* (2013.01); *Y10T 29/49* (2015.01)

(58) Field of Classification Search
CPC combination set(s) only.
See application file for complete search history.

(56) References Cited

U.S. PATENT DOCUMENTS 4,518,232 A * 5/1985 Dagenais ............. B23K 26/073
                                                     219/121.74
4,758,068 A * 7/1988 Aughton ................ B23K 26/06
                                                        359/900

(Continued)

FOREIGN PATENT DOCUMENTS

DE          19920293 A1    5/2000
DE          19936230 A1    3/2001

(Continued)

OTHER PUBLICATIONS

International Search Report for Application PCT/EP2011/054483 mailed Jul. 10, 2011.

(Continued)

*Primary Examiner* — Dana Ross
*Assistant Examiner* — Renee Larose
(74) *Attorney, Agent, or Firm* — Cohen & Hildebrand, PLLC (57) ABSTRACT

A device for applying laser radiation to an at least partially reflective or transparent region or a workpiece disposed in a working area, with a laser light source for generating the laser radiation and optics for influencing the laser radiation, such that the radiation is transferred into the working area, wherein the optics comprise at least one mirror that can reflect a part of the laser radiation reflected in the working area or a part of the laser radiation having passed through the working area, such that said part of the laser radiation is at least partially fed hack into the working area.

18 Claims, 7 Drawing Sheets

(56) References Cited

U.S. PATENT DOCUMENTS

| | | | |
|---|---|---|---|
| 5,285,320 A * | 2/1994 | Hohberg | B23K 26/0738 219/121.74 |
| 5,585,019 A * | 12/1996 | Gu | B23K 26/0656 219/121.73 |
| 5,615,048 A | 3/1997 | Davies et al. | |
| 5,925,271 A * | 7/1999 | Pollack | B23K 26/02 219/121.74 |
| 6,471,372 B1 | 10/2002 | Lissotschenko | |
| 7,102,118 B2 * | 9/2006 | Acker | B23K 26/0604 219/121.63 |
| 7,253,376 B2 * | 8/2007 | Zhang | B23K 26/0656 219/121.65 |
| 7,525,707 B2 * | 4/2009 | Warner, Jr. | B23K 26/0066 219/121.74 |
| 2003/0190112 A1 | 10/2003 | Doerr | |
| 2004/0188396 A1 * | 9/2004 | Talwar | B23K 26/032 219/121.65 |
| 2004/0241922 A1 | 12/2004 | Toida | |
| 2005/0236381 A1 * | 10/2005 | Nomaru | B23K 26/0853 219/121.74 |
| 2006/0091120 A1 | 5/2006 | Markle | |
| 2006/0191883 A1 * | 8/2006 | Wessner | B23K 26/0604 219/121.84 |
| 2006/0215721 A1 * | 9/2006 | Tanaka | B23K 26/0604 372/50.23 |
| 2008/0290077 A1 | 11/2008 | DeMeritt et al. | |

FOREIGN PATENT DOCUMENTS

| | | |
|---|---|---|
| DE | 10240033 A1 | 3/2004 |
| DE | 102007017363 A1 | 10/2008 |
| EP | 1074871 A2 | 2/2001 |
| JP | 10-244386 | 9/1998 |
| WO | WO 0248059 A1 | 6/2002 |
| WO | WO 2004020141 A1 | 3/2004 |

OTHER PUBLICATIONS

German Search Report for Application 10 2010 012 459.1 dated Nov. 19, 2010.

German Search Report for Application 10 2010 012 467.2 dated Nov. 22, 2010.

Born, Max and Wolf, Emil, "Electromagnetic Theory of Propagation, Interference and Diffraction of Light", Principles of Optics, 1999, pp. 95-103, 7th Edition, Cambridge University Press, Cambridge, United Kingdom.

* cited by examiner

DEVICE FOR APPLYING LASER RADIATION AND DEVICE FOR REPRODUCING A LINEAR LIGHT DISTRIBUTION

This is an application filed under 35 USC §371 of PCT/EP2011/054483, filed on Mar. 23, 2011 and claiming priority to DE 10 2010 012 467.2 filed on Mar. 24, 2010, DE 10 2010 012 459.1 filed on Mar. 24, 2010 and DE 10 2010 020 498.6 filed on May 14, 2010.

BACKGROUND OF THE INVENTION

The present invention relates to a device for applying laser radiation to an at least partially reflective or transparent area of a workpiece disposed in a work area according to the preamble of the claim 1 The present invention further relates to a device for reproducing a linear light distribution according to the preamble of claim 14, a laser device having such a device and a method for producing such a device.

Definitions: "In the direction of propagation of the laser radiation" refers to the average propagation direction of the laser radiation, in particular when the laser radiation is not a plane wave, or is at least partly divergent. Laser beam, light beam, sub-beam or beam, if not explicitly stated otherwise, does not refer to an idealized beam of geometrical optics, but a real light beam, such as for example a laser beam having a Gaussian profile, or a modified Gaussian profile or a top-hat profile, having not an infinitesimally small, but rather an extended beam cross section. Focal length of a lens or a cylindrical lens refers to the focal length of the lens in vacuum (refractive index $n_v=1$).

It should also be noted at this point that the refractive index in a medium—for example in air or glass—depends on the wavelength of light to be refracted. The refractive index is therefore designated hereinafter with $n(\lambda)$. An introduction to the theory of such dependencies can be found, for example, in Born, Max and Wolf, Emil, "Principles of Optics", $7^{th}$ edition, Cambridge University Press, Cambridge, 1999, pp. 97 ff.

Devices for applying laser radiation of the aforementioned type are well known. For example, the laser radiation is focused in a work area by a focusing lens, in which for example a layer of a substrate to which the laser radiation is to be applied in order cause to a chemical reaction or a structural transformation, and the like.

However, the prior art devices are not very effective when this layer has only a low optical density at the wavelength of the laser radiation, because in this case only a small fraction of the laser radiation is absorbed by the layer.

A device for reproducing a linear light distribution of the aforedescribed type is known, for example, from DE 199 36 230 A1. There, four arrays of cylindrical lenses are arranged in succession on two substrates in the propagation direction of the light of a light distribution to be imaged, wherein both the entrance surface and the exit surface of each of the substrates is provided with one of the arrays. All the cylindrical lenses are identical and have the same focal length. The thickness of the substrates and hence the distances between the array on the entrance side and the exit side each correspond to twice the focal length of the cylindrical lenses in the material of the substrates or to the product of twice the focal length and the refractive index of the material. The successively arranged cylindrical lenses then operate as a double telescope, so that the light distributions arranged at twice the focal length of the cylindrical lenses in front of substrates are imaged with a ratio 1:1 onto a plane disposed behind the substrates at a distance of twice the focal length.

Disadvantageously, such arrangement enables, on one hand, only size-preserving reproducing when the light distribution to be imaged is arranged in front of the substrates at twice the focal length of the cylindrical lenses. Furthermore, light beams incident at a large angle relative to the normal cannot realistically contribute to the image. In particular, such conventional device is unable to satisfactorily image a linear light distribution with a substantial longitudinal extent of, for example, more than 1 m in the direction of the line.

BRIEF SUMMARY OF THE INVENTION

The underlying problem of the present invention is to provide a more effective device of the aforementioned type for applying laser radiation. Furthermore, the present invention addresses the problem of providing a device for reproducing a linear light distribution of the aforedescribed type, which can be employed more effectively and universally, in particular for reproducing light distributions of large extent in the longitudinal direction of the line. Furthermore, a laser device having such a device will be described. A method for producing such a device will also be described.

This is attained according to the invention with respect to the device for applying laser radiation with a device of the aforementioned type having, an optical arrangement including at least one mirror for reflecting a portion of the laser radiation in the work area or a portion of the laser radiation that has passed through the work area, such that this portion of the laser radiation is at least partially returned to the work area. With respect of the device for reproducing a linear distribution of light with a device of the aforementioned type having $D_1=F_1 \cdot n_1(\lambda)$ and $D_2=F_2 \cdot n_2(\lambda)$, wherein $D_1$ is the distance between the vertex lines of the cylindrical lenses of the first array and the vertex lines of the cylindrical lenses of the second array, wherein $D_2$ is the distance between the vertex lines of the cylindrical lenses of the third array and the vertex lines of the cylindrical lenses of the fourth array, wherein $F_1$ is the focal length of at least one of the cylindrical lenses of the first array and/or the second array, wherein $F_2$ the focal length of at least one of the cylindrical lenses of the third array and/or of the fourth array, wherein $n_1(\lambda)$ is the refractive index of the first substrate at the wavelength $\lambda$ and wherein $n_2(\lambda)$ is the refractive index of the second substrate at the wavelength $\lambda$. With respect of the laser device with a laser device of the aforementioned type having a laser light source is provide capable of producing a linear light distribution (C) in a first plane with light of a wavelength $\lambda$, and a device capable of reproducing the light distribution (C) from the first plane onto a second plane. Further, with respect to the method for producing a device the following process steps are provided: determining the wavelength $\lambda$ of the light of light distribution (C) to be imaged, in particular determining the wavelength $\lambda$ of the light of a laser light source capable of producing a linear light distribution (C) in a first plane with light having a wavelength $\lambda$, selecting the distance $D_1$ between the vertex lines of the cylindrical lenses of the first array and the vertex lines of the cylindrical lenses of the second array as well as selecting the distance $D_2$ between the vertex lines of the cylindrical lenses of the third array and the vertex lines of the cylindrical lenses of the fourth array according to the following formula: $D_1=F_1 \cdot n_1(\lambda)$ and $D_2=F_2 \cdot n_2(\lambda)$. The dependent claims relate to preferred embodiment of the invention.

According to claim 1, the optical means include at least one mirror capable of reflecting a portion of the laser radiation reflected in the work area, or a portion of the laser radiation transmitted through the work area, such that this portion of the laser radiation is at least partially returned to the work area. This increases the effectiveness of the device because a portion of the laser radiation that was already used for the exposure is returned to the work area and can thus again be partially absorbed.

For this purpose, at least one first mirror may be arranged on the side of the work area facing away from the laser light source, with the mirror capable of reflecting a portion of the laser radiation transmitted through the work area, such that this portion of the laser radiation is at least partially returned to the work area.

Furthermore, the device may include, in addition to the at least one first mirror, at least one second mirror on the side of the work area facing the laser light source, with the second mirror capable of reflecting a portion of the laser radiation reflected by the first mirror and at least partially passing through the work area, such that this portion of the laser radiation is at least partially returned to the work area. In this manner, the laser radiation can be repeatedly returned to the work area.

Alternatively, the mirror or mirrors may be arranged only on the side of the work area facing laser light source, wherein the one or more mirrors may reflect a portion of the laser radiation reflected to the work area, such that this portion of the laser radiation is at least partially returned to the work area. This embodiment is particularly suitable for the exposure of materials that provide little or no transmission at the employed laser wavelength.

The at least one mirror may have an outer and/or an inner reflective surface. For example, coated outer surfaces of a planar or curved body and/or reflective inner surfaces in a prism and the like may be used as a mirror. In particular, two mirrors abutting at an angle of 90° may be realized through internal reflections in a prism.

According to claim 14, it is provided that $$D_1 = F_1 \cdot n_1(\lambda) \text{ and } D_2 = F_2 \cdot n_2(\lambda),$$

wherein $D_1$ is the distance between the vertex lines of the cylindrical lenses of the first array and the vertex lines of the cylindrical lenses of the second array, wherein $D_2$ is the distance between the vertex lines of the cylindrical lenses of the third array and the vertex lines of the cylindrical lenses of the fourth array, wherein $F_1$ is the focal length of at least one of the cylindrical lenses of the first array and/or the second array, wherein $F_2$ the focal length of at least one of the cylindrical lenses of the third array and/or of the fourth array, wherein $n_1(\lambda)$ is the refractive index of the first substrate at the wavelength $\lambda$, and wherein $n_2(\lambda)$ is the refractive index of the second substrate at the wavelength $\lambda$.

With such a design, the light distribution to be imaged may be arranged, on one hand, at a comparatively arbitrary distance from the device, without significantly affecting the quality of the image. On the other hand, light beams incident on the device at a large angle to the normal may also contribute to the image, so that light distributions having a large extent in the direction of the line can also be imaged realistically.

With such a device, an optical path similar to the optical path in a retro-reflection arrangement can be realized, except that reflection, instead of transmission, takes place in the device of the invention. Therefore, in the context of the device of claim 14, reference may be made to a "retro-transmission." Specifically, although the phase relationships of the individual portions of the light to be imaged are eliminated with passage through the device, the divergence angles of at least some portions of the light are nevertheless maintained or are transformed into corresponding convergence angles.

BRIEF DESCRIPTION OF THE DRAWINGS

Additional features and advantages of the present invention will become apparent from the following description of preferred embodiments with reference to the appended drawings, which show in FIG. 1 a schematic side view of a first embodiment of a device according to the invention for applying laser radiation.

DETAILED DESCRIPTION OF THE INVENTION

In the figures, identical or functionally identical parts or beams are designated with identical reference symbols. Furthermore, a Cartesian coordinate system is indicated in several figures for better orientation.

Laser radiation is emitted from an unillustrated laser light source which in the illustrated embodiment is a collimated laser radiation 1. For example, the laser radiation 1 is to be applied to an (unillustrated) layer of a substrate in a work plane 2. This layer has, for example, a low optical density at the wavelength of the laser radiation 1. This means that only a small portion of the laser radiation 1 is absorbed by the layer when the laser radiation 1 passes through the layer.

Figure 1:
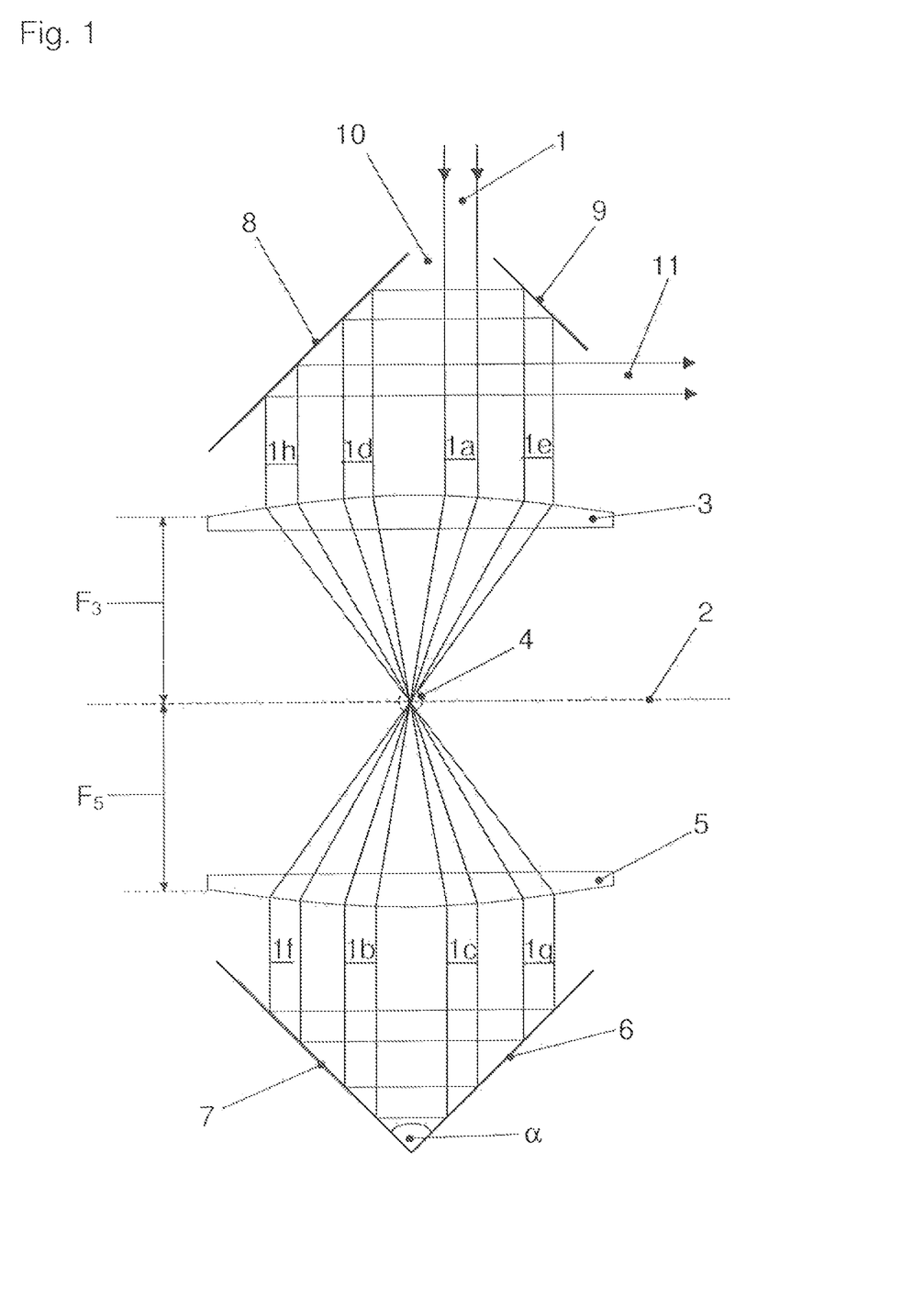

The embodiment of a device for applying a laser beam shown in FIG. 1 includes a first lens 3 on the side of the work plane 2 facing the laser fight source. The first lens 3 has positive refractive power and focuses the laser radiation 1 into a work area 4, which is arranged in the work plane 2. The first lens 3 is here arranged at a distance from the work plane 2 corresponding to the focal length $F_3$ of the first lens 3. The first lens 3 is designed, for example, as planoconvex lens.

A portion of the laser radiation 1 is absorbed in the work area 4 by the unillustrated layer of the substrate.

A second lens 5 which also has positive refractive power is arranged on the side of the work plane 2 facing away from the laser light source. The second lens 5 is also arranged at a distance from the work plane 2, with the distance corresponding to the focal length $F_5$ to the second lens 5. The focal lengths $F_3$ and $F_5$ in the illustrated embodiment are identical. The second lens 5 is also formed, for example, as a plano-convex lens.

A first mirror 6 and a second mirror 7 whose reflecting surfaces enclose an angle α of 90° and which in particular adjoin one another at this angle are arranged on the side of the second lens 5 facing away from the work plane 2. The mirrors 6, 7 are here each aligned at an angle of 45° in relation to the work plane 2 and to the laser radiation 1, respectively.

Furthermore, a third mirror 8 and a fourth mirror 9 whose reflective surfaces also include an angle of 90° are arranged on the side of the first lens 3 facing away from the work plane 2. The mirrors 8, 9 are here each also aligned at an angle of 45° to the work plane 2 and to the laser radiation 1, respectively. However, the third and fourth mirrors 8, 9 do not abut each other, but define between them a space 10, through which the laser radiation 1 can enter into the device. Furthermore, the fourth mirror 9 is comparatively short, so that laser radiation 11 can exit the device by passing on the side of the fourth mirror 9 facing the work plane 2. The fourth mirror 9 is thus arranged asymmetrically, in the device.

As seen in FIG. 1, the incident laser radiation 1 is deflected by the lenses 3, 5 and the mirrors 6, 7, 8, 9 so as to pass four times through the work area 4. Due to the four-time passage, a comparatively large amount of the laser radiation can be absorbed by the layer of the substrate that is not imaged. The laser radiation twice follows a course in the device corresponding to an "8". The laser radiation is denoted in the interior of the device in order of appearance by the reference symbols 1a, 1b, 1c, 1d, 1e, 1f, 1g and 1h.

The laser radiation is denoted as laser radiation 1a after entering the device. After passing through the lenses 3, 5 and the work area 4, the laser radiation 1a is denoted as laser radiation 1b. The laser radiation 1b is denoted as laser radiation 1c after reflection at the first and second mirrors 6, 7. The laser radiation 1c is denoted as laser radiation 1d after passing through the lenses 3, 5 and the work area 4. The laser radiation 1d is denoted as laser radiation 1e after reflection at the third and fourth mirrors 8, 9. The laser radiation 1e is denoted as laser radiation 1f after passing through the lenses 3, 5 and the work area 4. The laser radiation 1f is denoted as laser radiation 1g after reflection at the first and second mirrors 6, 7. The laser radiation 1g is denoted as laser radiation 1h after passing through the lenses 3, 5 and the work area 4.

The laser radiation 1h exits from the device as a laser radiation 11 after reflection on the third mirror 8. The laser radiation 11 exits the device toward the right in FIG. 1, and thus at an angle of 90° relative to the first laser radiation 1. In this way, a portion of the laser radiation exiting from the device 11 is prevented from returning to the unillustrated laser light source.

Figure 2:
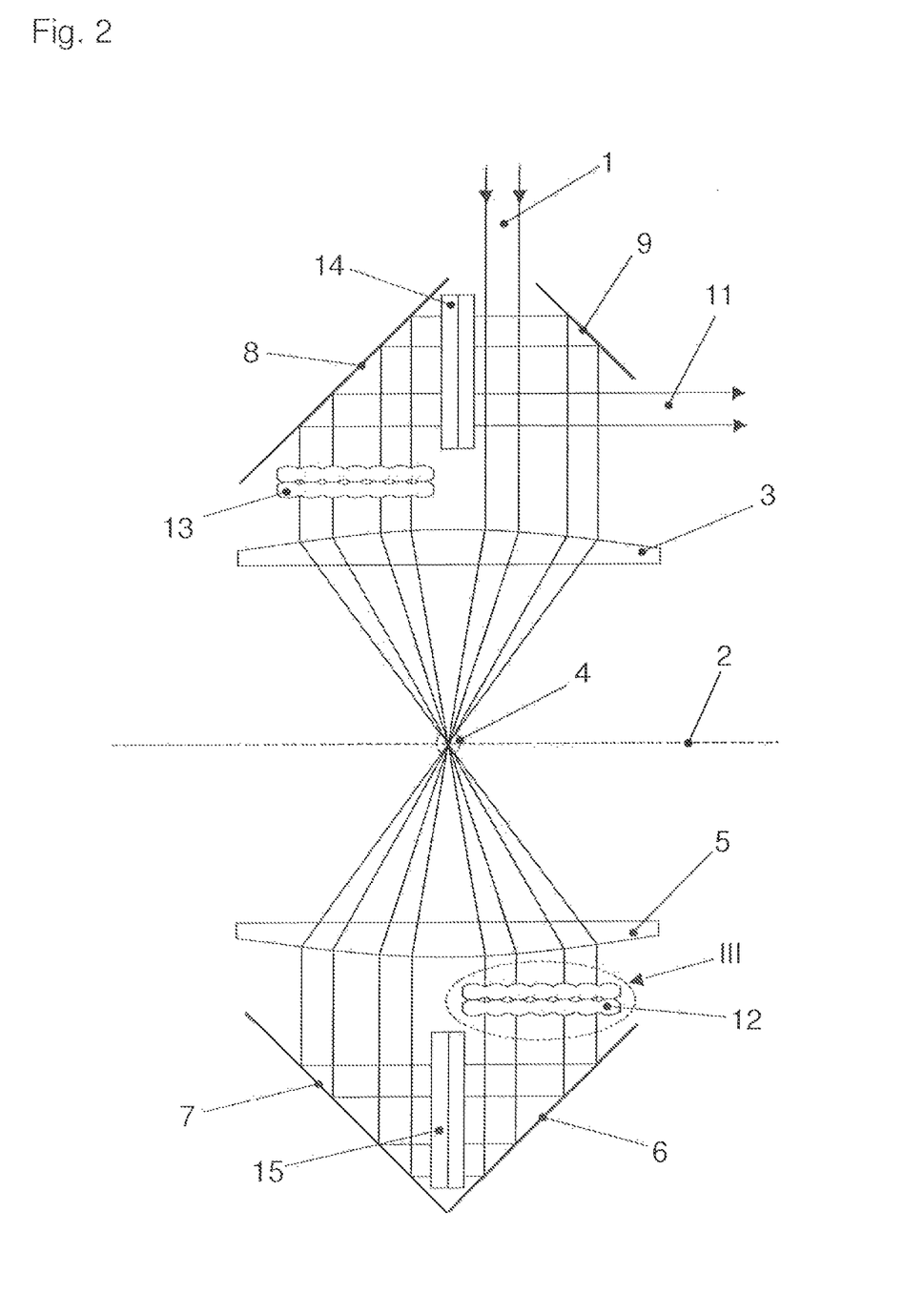
FIG. 2 a schematic side view of a second embodiment of a device according to the invention for applying laser radiation.

The second embodiment differs from the first embodiment in that the device includes additionally a plurality of lens array means 12, 13, 14, 15. The lens array means 12, 13, 14, 15 are constructed identically, but differ from one another in their location and orientation. An exemplary lens array means 12 is shown in FIG. 3.

The lens array means 12 includes, like any of the other lens array means 13, 14, 15, two substrates 12a, 12b which are, in particular, made of the same material and have the same refractive index. The first substrate 12a has a first array 16 and a second array 17 of cylindrical lenses 18 disposed on opposite sides. The second substrate 12b has a third array 19 and a fourth array 20 of cylindrical lenses 18 disposed on opposite sides. In particular, the second array 17 formed on the first substrate 12a abuts the third array 19 formed on the second substrate 12b.

Figure 3:
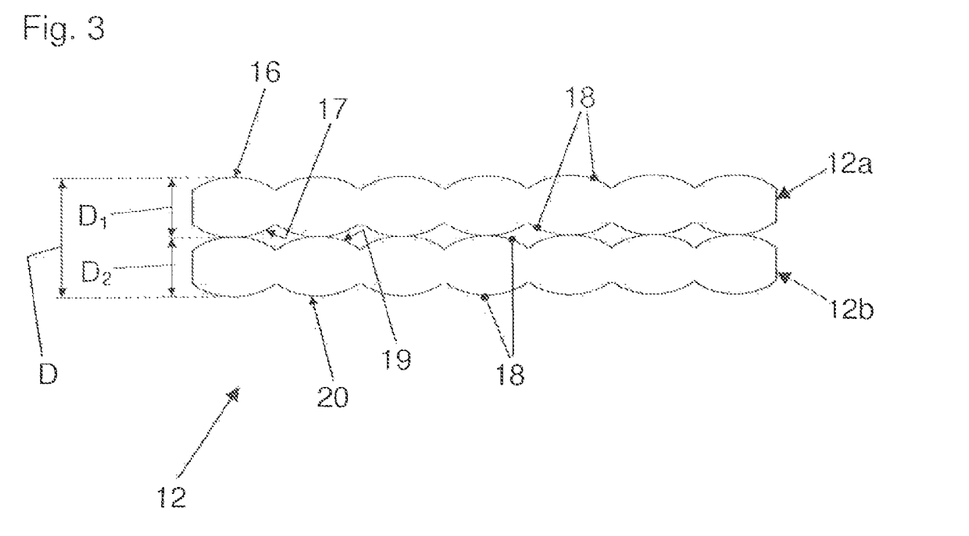
FIG. 3 a detailed view according to the arrow III in FIG. 2.

The cylindrical lenses 18 are oriented such that their cylinder axes extend in the drawing plane of FIG. 3. All focal lengths f of the cylindrical lenses 18 are identical. The distance $D_1$ from the vertex lines of the cylindrical lenses 18 of the first array 16 to the vertex lines of the cylindrical lenses 18 of the second array 17 corresponds to the product of the focal length f and the refractive index n(λ) of the first substrate 12a at the wavelength λ of the laser radiation 1. Furthermore, the distance $D_2$ from the vertex lines of the cylindrical lenses 18 of the third array 19 to the vertex lines of the cylindrical lenses 18 of the fourth array 20 also corresponds to the product of the focal length f and the refractive index n(λ) of the second substrate 12b at the wavelength λ of the laser radiation 1.

Thus, an array of thick Fourier lenses is formed on each substrate 12a, 12b, namely lenses where the two refracting surfaces serving as cylindrical lenses 18 are arranged exactly in the distance $D_1$, $D_2$ of the product of focal length f and refractive index n(λ), respectively.

Because in the illustrated exemplary embodiment the focal lengths f of all cylindrical lenses 18 are identical, and the refractive indices n(λ) of both substrates 12a, 12b are also identical, the distances $D_1$ and $D_2$ are also identical. Because especially the vertex lines of the cylindrical lenses 18 of the second array 17 abut the vertex lines of the cylindrical lenses 18 of the third array 19, the total thickness D of the device (see FIG. 3) is calculated as:

$$D=D_1+D_2=2\cdot f\cdot n(\lambda),$$

Four cylindrical lenses 18 successively arranged in the Z direction on each of the first, second, third and fourth array 16, 17, 19, 20 thus constitute a channel operating as a telescope. The magnification of these individual telescopes in the illustrated embodiment corresponds to −1. The central cylinder lenses 18, which are arranged in the second and the third array 17, 19, operate here as additional field lenses which enable reproducing of light that is incident on the lens array means 12 at large angles to the normal. Alternatively, the middle arrays 17, 19 may be omitted.

When laser radiation passes repeatedly through the work area 4 of a device without the lens array means, as shown in FIG. 1, the Rayleigh length of the focus of laser radiation in the work area 4 becomes increasingly smaller. The focus may then sometimes be shifted upward or downward relative to the work plane 2, thus reducing the effectiveness of the absorption by the unillustrated layer of the substrate.

In a device for applying laser radiation according to FIG. 2, the lens array means 12, 13, 14, 15 may invert the divergence of the laser radiation passing through. The Rayleigh lengths observable with a device according to FIG. 1 then do not change even when the substrate is displaced out of the work plane 2.

The lens array means 12, 13 are oriented such that the cylindrical axes of their cylindrical lenses 18 extend in the drawing plane of FIG. 2. Conversely, the lens array means 14, 15 are oriented such that the cylinder axes of their cylindrical lenses extend in the drawing plane of FIG. 2. The lens array means 12, 13, on the one hand, and the lens array means 14, 15 thus operate on different axes of the cross section of the laser radiation.

Figure 4:
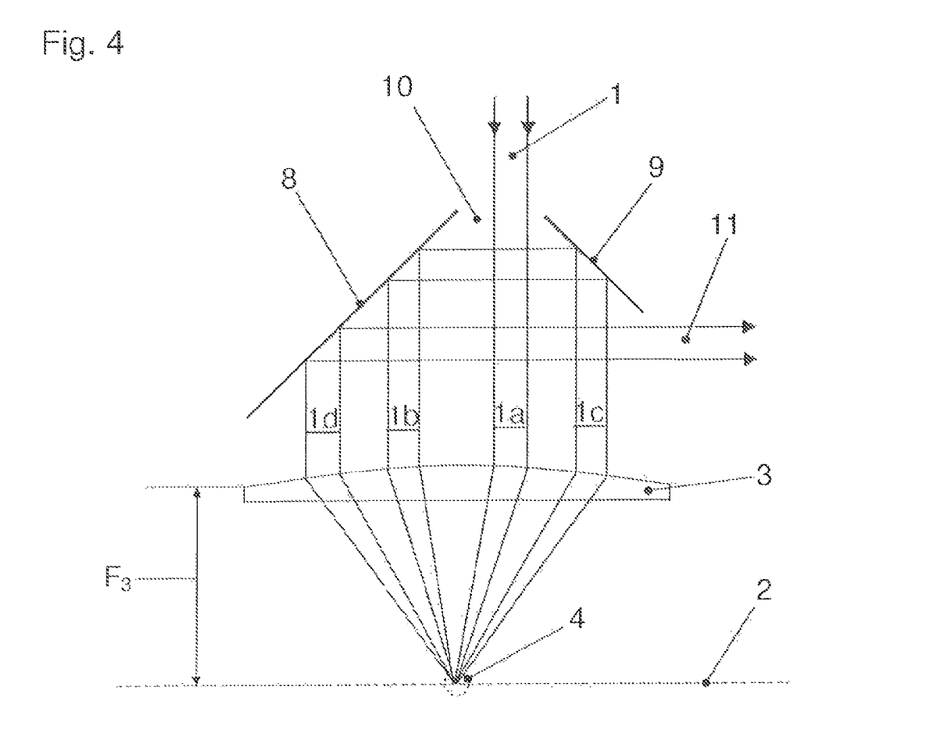
FIG. 4 a schematic side view of a third embodiment of a device according to the invention for applying laser radiation.

The embodiment according to FIG. 4 differs from that of FIG. 1 in that the second lens 5 disposed on the side of the work plane 2 facing away from the laser light source and the mirrors 6, 7 arranged on the side of the work plane 2 facing away from the laser light source are absent. This makes the device suitable for applying laser radiation to materials, which have an at least partly reflective surface.

FIG. 4 shows that the incident laser radiation 1 is deflected by the lens 3 and the mirrors 8, 9 so that it passes altogether twice through the work area 4. Due to the two-time passage, a greater amount of laser radiation can be absorbed by the unillustrated layer of the substrate than in a single pass. The laser radiation in the device takes here twice a course corresponding to a deformed "O". The laser radiation in the interior of the device in order of appearance is denoted with the reference symbols 1a, 1b, 1c, 1d.

The laser radiation 1 after entering the device is denoted as a laser radiation 1a. The laser radiation 1a after reflection at the work plane 2 is denoted as a laser radiation 1b. The laser radiation 1b is denoted as a laser radiation 1c after reflection at the third and fourth mirrors 8, 9. The laser radiation 1c is denoted as a laser radiation 1d after reflection at the work plane 2.

The laser radiation 1d exits from the device a laser radiation 11 after reflection on the third mirror 8. The laser radiation 11 exits the device toward the right in FIG. 4, and thus at an angle of 90° to the incident laser radiation 1. This prevents a portion of the laser radiation 11 exiting from the device to return to the unillustrated laser light source.

Figure 5:
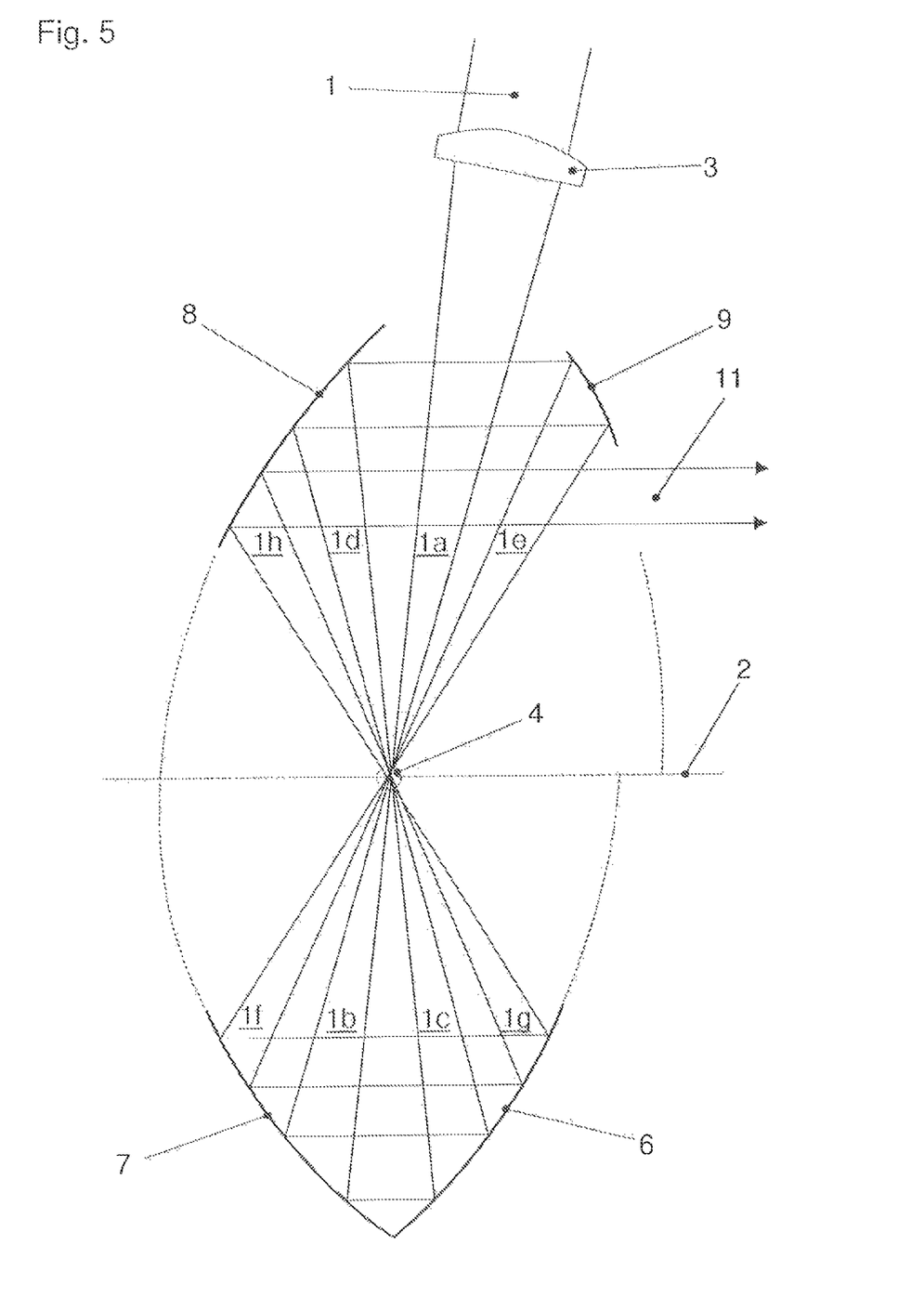
FIG. 5 a schematic side view of a fourth embodiment of a device according to the invention for applying laser radiation.

Unlike the embodiments according to FIG. 1, FIG. 2 and FIG. 4, the embodiment of FIG. 5 has curved mirrors 6, 7, 8, 9 instead of the plane mirrors 6, 7, 8, 9. The mirrors 6, 7, 8, 9 may have, for example, a parabolic or an elliptical shape. For this reason, the lenses in the interior of the device may be omitted. Only a first lens 3 is provided, which focuses the incident laser radiation 1 in the work area 4.

After being focused once, the laser beam needs no longer pass through the first lens 3, because the curved mirror 6, 7, 8, 9 ensure re-focusing of the laser radiation in the work area 4. This design greatly reduces the number of refractions and also reduces corresponding losses.

In this embodiment, the third and fourth mirrors 8, 9 also not to abut each other, but define between them a space 10, through which the laser radiation 1 can enter into the device. Moreover, the fourth mirror 9 is comparatively short, so that laser radiation 11 can exit the device on the side of the fourth mirror 9 facing the work plane. The fourth mirror 9 is therefore also asymmetrically arranged in the device.

The laser radiation in the interior of the device is denoted with the same reference symbols 1a, 1b, 1c, 1d, 1e, 1f, 1g and 1h as in FIGS. 1 and 2 and also follows substantially the same path, namely twice a path corresponding to an "8".

Furthermore, lens array means may also be provided in a device for applying laser radiation according to FIG. 5, like in the embodiment of FIG. 2. Moreover, the embodiment shown in FIG. 5 may also be implemented on only one side, thus producing a device suitable for reflective media which is similar to the device according to FIG. 4.

Figure 6:
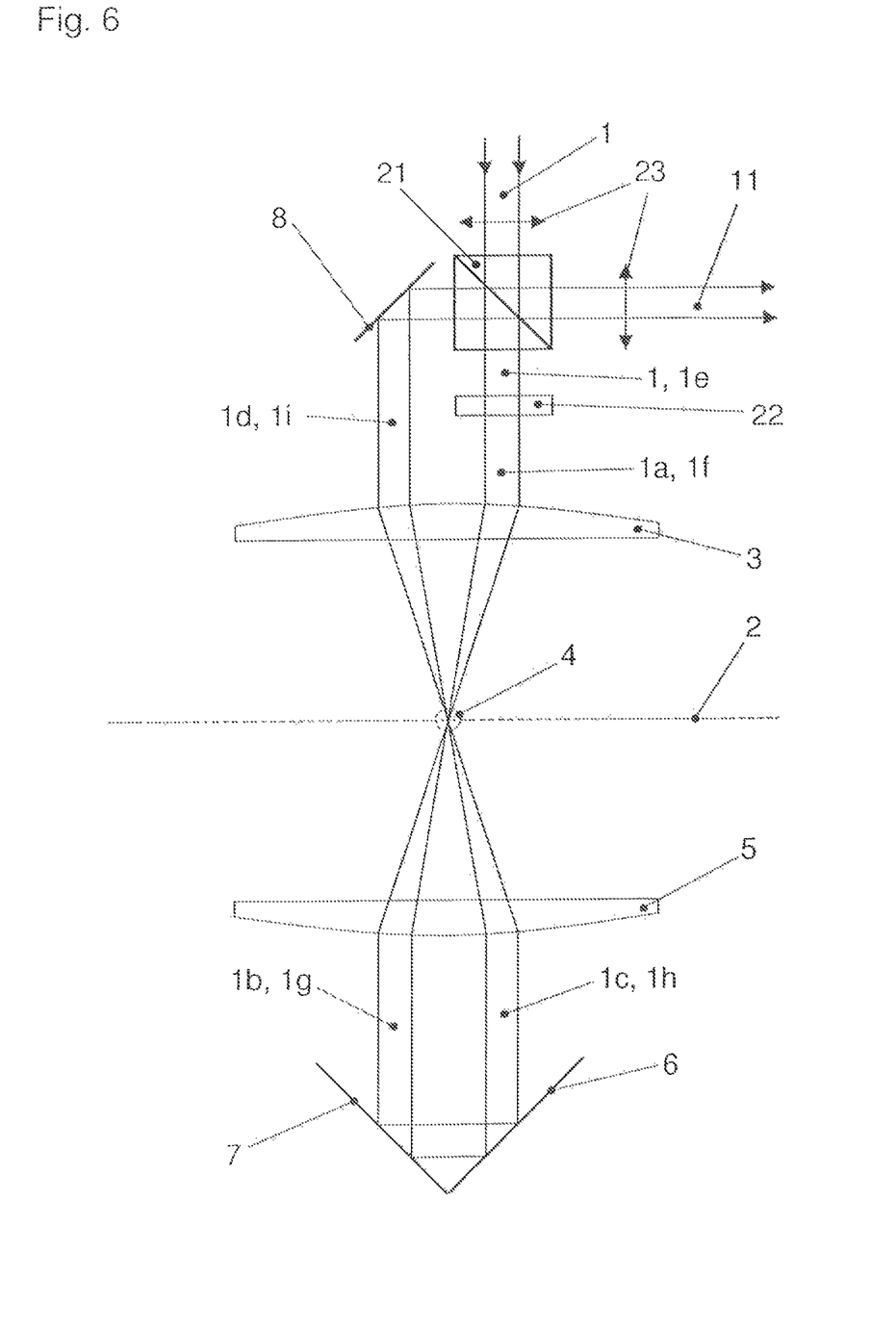
FIG. 6 a schematic side view of a fifth embodiment of a device according to the invention for applying laser radiation.

The fifth embodiment of FIG. 6 differs from the first embodiment of FIG. 1 in that the fourth mirror 9 is replaced with a polarization-selective beam splitter 21 embodied as a polarization cube and a polarization rotator 22 embodied as a half-wave plate.

The arrow 23 indicates that the laser radiation 1 entering the device has a polarization direction in the drawing plane of FIG. 6. The polarization-selective beam splitter 21 and the polarization rotator 22 are disposed approximately at the height of the third mirror 8 before the first lens 3, so that the incident laser radiation 1 passes through the polarization-selective beam sputter 21 and the rotator 22 before impinging on the first lens 3. The polarization-selective beam splitter 21 is here constructed and arranged such light incident from the top in FIG. 6 and having a polarization direction extending in the drawing plane passes unobstructed through the beam splitter 21 downward in FIG. 6.

The polarization direction is rotated by the downstream polarization rotator 22, so as to be oriented perpendicular to drawing plane of FIG. 6.

In FIG. 6, the laser radiation 1 is denoted as a laser radiation 1a after passing through the polarization rotator 22. The laser radiation 1a is denoted as laser radiation 1b after passing through the lenses 3, 5 and the work area 4. The laser radiation 1b is denoted as laser radiation 1c after reflection on the first and second mirrors 6, 7. The laser radiation 1c is denoted as laser radiation 1d after passing through the lenses 3, 5 and the work area 4.

Because the laser radiation has a polarization oriented perpendicular to the drawing plane of FIG. 6, it is reflected downward in FIG. 6 by the polarization-selective beam splitter 21. After reflection on the third mirror 8 and the polarization-selective beam splitter 21, the laser radiation is referred to as laser radiation 1e. The laser radiation 1e then passes through the polarization rotator 22 and is referred to after passage as laser radiation 1f. Passage through the polarization rotator 22 causes the laser radiation 1f to have a polarization direction lying in the drawing plane of FIG. 6.

The laser radiation 1f is denoted as laser radiation 1g after passing through the lenses 3, 5 and the work area 4. The laser radiation 1g is denoted as laser radiation 1h after reflection on the first and the second mirror 6, 7. The laser radiation 1h is denoted as laser radiation 1i after passing through the lenses 3, 5 and the work area 4.

The laser radiation 1i impinges after reflection on the third mirror 8 on the polarization-selective beam splitter 21 and is transmitted therethrough unimpededly toward the right in FIG. 6 because its polarization direction is in the plane of FIG. 6.

It exits from the device as laser radiation 11, wherein the polarization direction in the drawing plane is indicated by the arrow 23. The laser radiation 11 exits the device toward the right in FIG. 1, and thus at an angle of 90° to the incident laser radiation 1. This prevents a portion of the laser radiation 11 emitted from the device 11 to return to the unillustrated laser light source.

In the embodiment of FIG. 6, the laser radiation also passes four times through the work area 4 and follows in the device twice a path that corresponds to an "8".

Lens array means may also be employed in a device according to FIG. 6, similar to the embodiment shown in FIG. 2. The embodiment of FIG. 6 may also be implemented on only one side, thus producing a device suitable for reflective media, similar to the device of FIG. 4.

It turns out that the lens array means 12 described in detail with reference to FIG. 3 can also be used to image a linear light distribution. Therefore, the device depicted in FIGS. 7 and 8 for reproducing a linear light distribution can correspond, in particular, to the lens array means 12 according to FIG. 3.

Figure 7:
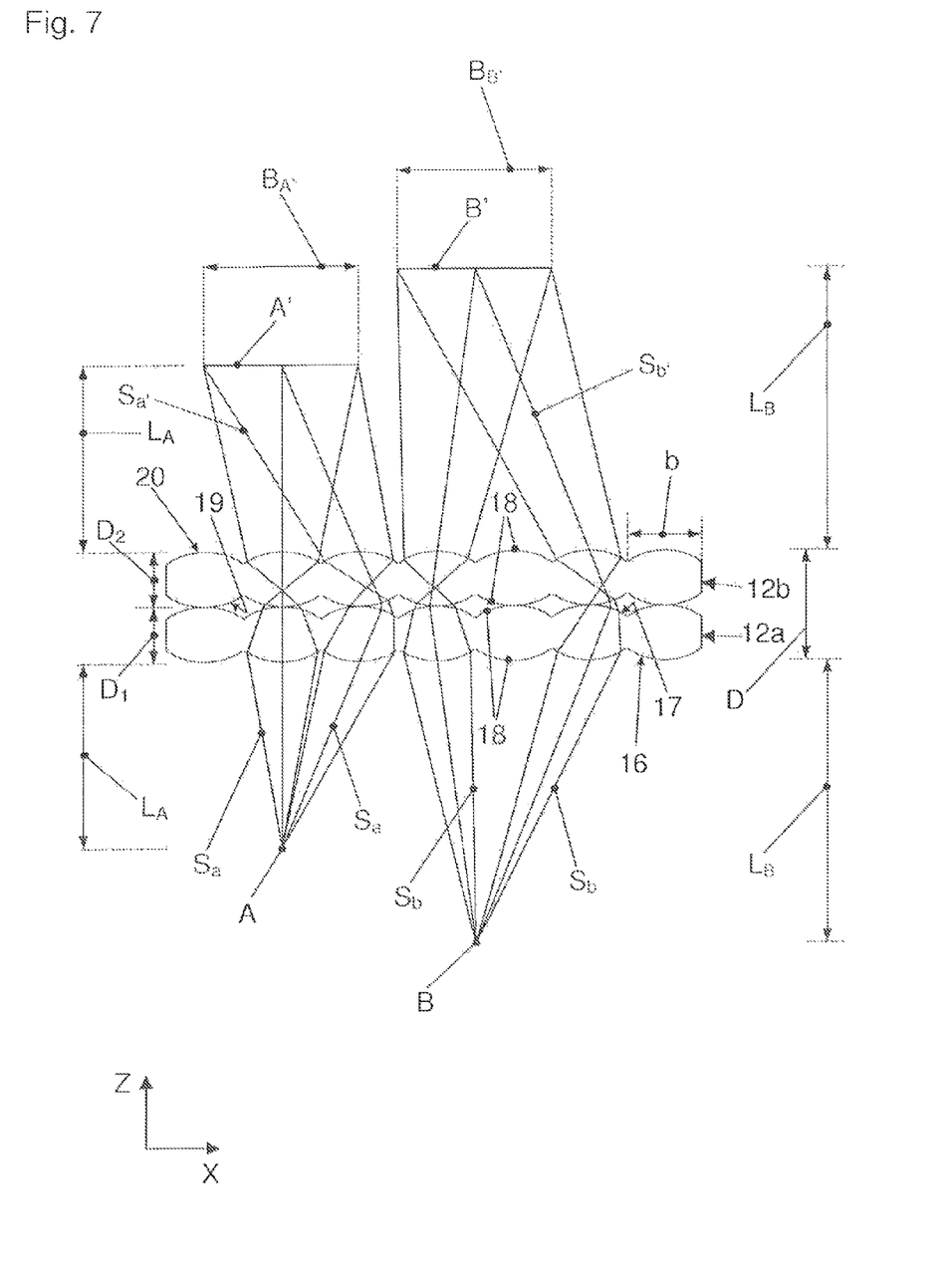
FIG. 7 a schematic side view of a first embodiment of a device according to the invention for reproducing a linear light distribution.
Figure 8:
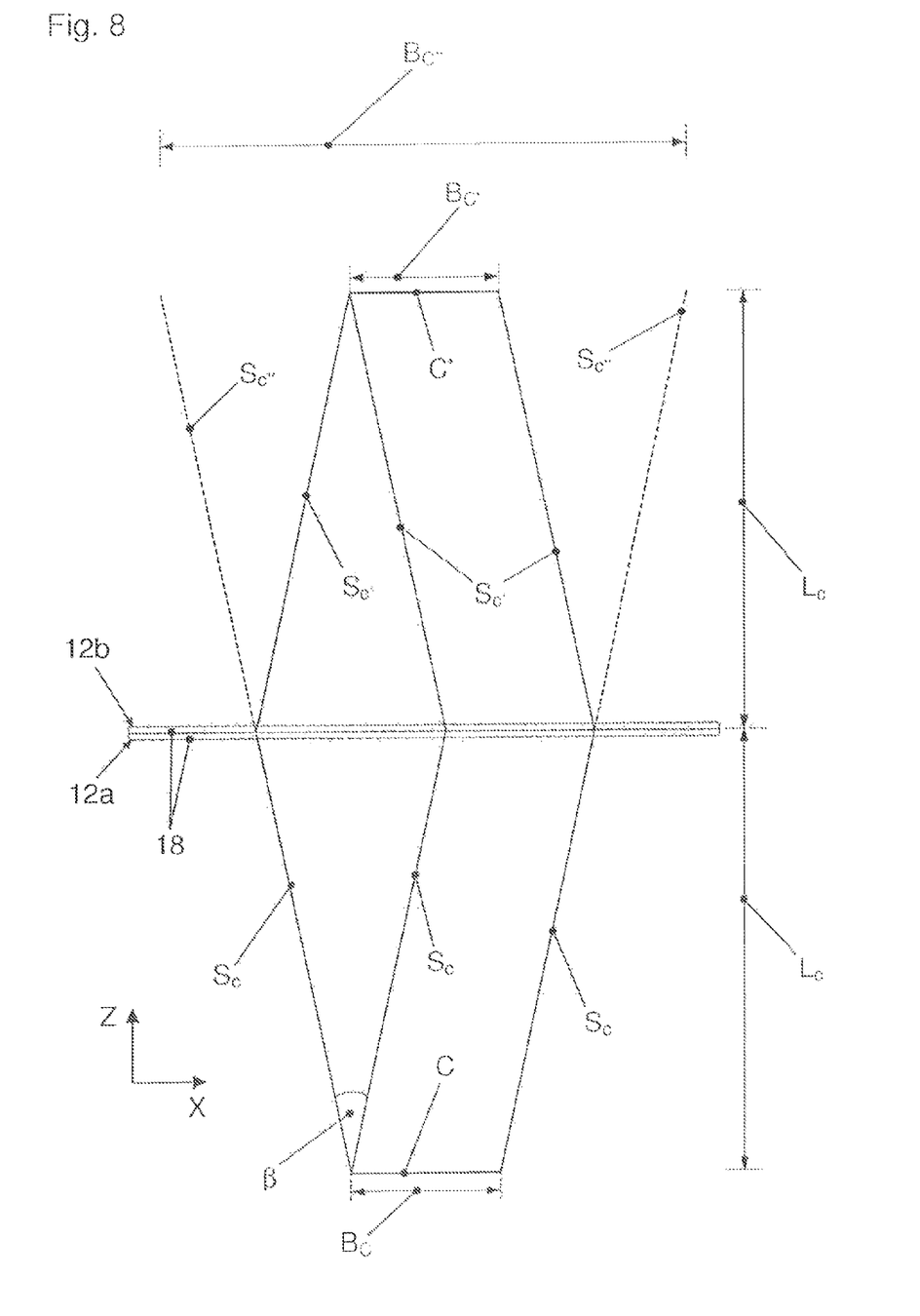
FIG. 8 a schematic side view of a second embodiment of a device according to the invention for reproducing a linear light distribution.

The device according to FIGS. 7 and 8 generally includes a first substrate 12a and a second substrate 12b. The first substrate 12a has a refractive index $n_1(\lambda)$, which is at least in sections and at least at one wavelength $\lambda$ equal to the refractive index $n_2(\lambda)$ of the second substrate. In particular, at least portions of the two substrates 12a, 12b are made from the same material.

The first substrate 12a has a first array 16 and a second array 17 of cylindrical lenses 18 disposed on opposite sides in the Z direction. The cylindrical lenses 18 in both the first array 16 and the second array 17 are each arranged side-by-side in the X-direction and are oriented so that their cylinder axis extends in the Y-direction or in the drawing plane of FIGS. 7 and 8, respectively.

The second substrate 12b has a third array 19 and a fourth array 20 of cylindrical lenses 18 arranged on opposing sides in the Z-direction. The cylindrical lenses 18 of the third array 19 and the fourth array 20 are each arranged side-by-side in the X-direction and oriented so that their cylinder axis extends in the Y-direction or in the drawing plane of FIGS. 7 and 8, respectively.

The cylindrical lenses 18 of the first, second, third and fourth arrays 16, 17, 19, 20 each have the same width b in the X direction (see FIG. 7).

In particular, the vertex lines of the cylindrical lenses 18 of the second array 17, which is formed on the first substrate 12a, abut the vertex ones of the cylindrical lenses 18 of the third array 19, which is formed on the second substrate 12b.

The cylindrical lenses 18 of the first and the second array 16, 17 have all an identical focal length $F_1$. The cylindrical lenses 18 of the third and the fourth array 19, 20 likewise have all the same focal length $F_2$. In particular, the focal length $F_1$ of the cylindrical lenses 18 of the first and second array 16, 17 is equal to the focal length $F_2$ of the cylindrical lenses 18 of the third and fourth array 19, 20.

The distance $D_1$ of the vertex lines of the cylindrical lenses 18 of the first array 16 to the vertex lines of the cylindrical lenses 18 of the second array 17 corresponds here to the product of the focal length $F_1$ and the refractive index $n_1(\lambda)$ of the first substrate 12a. Furthermore, the distance $D_2$ of the vertex lines of the cylindrical lenses 18 of the third array 19 to the vertex lines of the cylindrical lenses 18 of the fourth array 20 corresponds to the product of the focal length $F_2$ and the refractive index $n_2(\lambda)$ of the second substrate 12b.

Accordingly, an array of thick Fourier lenses is formed on each substrate 12a, 12b, namely lenses where the two refracting surfaces operating as cylindrical lenses 18 are arranged exactly at the distance $D_1$, $D_2$ of the product of focal length $F_1$, $F_2$, and refractive index $n_1(\lambda)$, $n_2(\lambda)$.

Because in the illustrated exemplary embodiment the focal length $F_1$ is equal to the focal length $F_2$ and the refractive index $n_1(\lambda)$ is equal to the refractive index $n_2(\lambda)$, the distances $D_1$ and $D_2$ are also identical. In particular, because the vertex lines of the cylindrical lenses 18 of the second array 17 abut the vertex lines of the cylindrical lenses 18 of the third array 19, the total thickness D of the device is (see FIG. 7):

$$D = D_1 + D_2 = 2 \cdot f_1 \cdot n_1(\lambda) = 2 \cdot f_2 \cdot n_2(\lambda).$$

Four cylindrical lenses 18 which are arranged successively on the first, the second, the third and the fourth array 16, 17, 19, 20 in the Z direction thus constitute a channel operating as a telescope. In the illustrated exemplary embodiment, the magnification of these individual telescopes is −1. The central cylinder lenses 18 arranged in the second and the third array 17, 19 hereby operate as additional field lenses which enable reproducing of light incident on the device at large angles to the normal.

FIG. 7 shows reproducing of two point-shaped light distributions A, B with a device according to the invention. The light distribution A in the Z-direction has here a distance $L_A$ to the device, wherein $L_A$ in particular denotes the distance between the light distribution A and the plane in which the vertex lines of the cylindrical lenses 18 of the first array 16 are located (see FIG. 7). Furthermore, the light distribution B in the Z direction has likewise a distance $L_B$ to the device, wherein $L_B$ in particular denotes the distance between the light distribution B and the plane in which the vertex lines of the cylindrical lenses 18 of the second array 20 are located.

To more clearly illustrate the reproducing process, the light beams $S_a$, $S_b$ originating from the light distributions A, B and the light beams $S_{a'}$, $S_{b'}$ refracted on the cylindrical lenses 18 are illustrated. The illustrated light beams $S_a$, $S_b$, $S_{a'}$, $S_{b'}$ are only shown as examples and correspond to idealized light beams of geometrical optics.

The images of the light distributions A, B are indicated in FIG. 7 with the reference symbols A', B'. These images A', B' have the same distance from the inventive device as the light distributions A, B. This means that the image A' has a distance $L_A$ to the plane in which the vertex lines of the cylindrical lenses 18 of the second and third arrays 17, 19 abut one another. Furthermore, the image B' has a distance $L_B$ to the plane in which the vertex lines of the cylindrical lenses 18 of the second and third array 17, 19 abut each other.

It turns out that the images are not point-shaped, but are widened into lines in the X-direction, i.e. in the direction in which the cylindrical lenses 18 are arranged side-by-side. The width $B_{A'}$, $B_{B'}$ of the images A', B' in the X-direction depends in each case on the width b of the cylindrical lenses 18, on the magnitude of the distance $L_A$, $L_B$ of the images A', B' to the device, and on the wavelength $\lambda$ of the light of the light distributions A, B. In particular, the following formulas apply:

$$B_{A'} = 2 \cdot \left( b + \frac{\lambda}{b} \cdot L_A \right) \quad (1)$$

and $$B_{B'} = 2 \cdot \left( b + \frac{\lambda}{b} \cdot L_B \right). \quad (2)$$

With a width b of the cylindrical lenses 18, which is large compared to the wavelength $\lambda$ of the light of the light distributions A, B, the width $B_{A'}$, $B_{B'}$ of the images A', B' in the X-direction thus is about twice the width b of the cylindrical lenses 18.

When reproducing point-shaped light distributions, this broadening of the images in the X-direction can cause disturbances. This is different for light distributions that extend appreciably in the X-direction. This situation is illustrated in AG. 8.

The embodiment of an inventive device according to FIG. 8 differs from that of FIG. 7 only in that the substrates 12a, 12b have a greater extent in the X-direction, i.e. have a larger number of cylindrical lenses 18 arranged side-by-side. The size and number of cylindrical lenses 18 are exemplary only and may actually be different from the illustration.

FIG. 8 shows a linear light distribution C in a first plane which has a distance $L_C$ from the inventive device in the Z-direction, wherein $L_C$ refers in particular to the distance between the light distribution C and the plane in which vertex lines of the cylindrical lenses 18 of the second and the third array 17, 19 abut each other. The width $B_C$ of the light distribution C and the magnitude of the distance $L_C$ are only shown schematically and may actually have values or ratios that deviate from the illustration.

For example, the width $B_C$ of the light distribution C in the X-direction may be 3 m. Furthermore, the distance $L_C$ of the light distribution C from the device in the Z-direction may be 1 m. With an assumed one-sided divergence (see angle β in FIG. 8) of about 11° between exemplary light beams $S_C$ originating from the light distribution C, a width $B_C$ of 3.8 m would result in the X direction after a distance of 2 m, if the light distribution C were to propagate unimpededly in accordance with the light beams $S_{C''}$, meaning in absence of the inventive device (see FIG. 8). The light beams $S_C$, $S_{C'}$, $S_{C''}$ illustrated in FIG. 8 are also shown by way of example and correspond to idealized light beams of geometrical optics.

The width b of the cylindrical lenses 18 in the X direction is assumed to be 2 mm. The arrangement of such an inventive device at a distance $L_C$ of approximately 1 m behind the light distribution C produces an image C' in a second plane which has a distance $L_C$ of about 1 m from the device. The light beams $S_{C'}$ refracted on the device make this illustration clearer. In the assumed example, the width $B_{C'}$ of the image C' in the X-direction is only 3.004 m, because according to the formula (1), the additional width is about twice the width b (=2 mm) of the cylindrical lenses 18.

This causes a broadening of the image C' compared to the original light distribution C in a range of approximately 0.1%. Such broadening will be negligible in most applications. To attain an image of similar quality with other prior art devices, complex optical wave-guiding techniques would have to be employed.

The invention claimed is:

1. A device for applying laser radiation (1) to an at least partially reflective or transparent portion work area (4) of a workpiece arranged in a work plane (2), comprising:
   a laser light source for generating the laser radiation (1);
   optical arrangement for influencing the laser radiation (1) such that the laser radiation (1) is transferred to the work area (4); the optical arrangement comprise at least one mirror (6, 7, 8, 9) reflecting a portion of the laser radiation (1) reflected in the work area (4) or a portion of the laser radiation (1) that has passed through the work area (4), such that this portion of the laser radiation (1) is at least partially returned to the work area,
   wherein the optical arrangement disposed on one side or on each of the sides of the work area (4) comprises more than one mirror (6, 7, 8, 9),
   wherein the laser radiation is reflected on each of the sides of the work area (4) by the more than one mirror (6, 7, 8, 9) twice along a closed course,
   wherein each of the mirrors (6, 7, 8, 9) are arranged at an angle of 45° in relation to the work plane (2) and the laser radiation (1).

2. The device according to claim 1, wherein the optical arrangement comprises at least one lens (3, 5).

3. The device according to claim 2, wherein the at least one lens (3, 5) is arranged between the work area (4) and the at least one mirror (6, 7, 8, 9).

4. The device according to claim 1, wherein at least one first mirror (6, 7) is arranged on the side of the work area (4) facing away from the laser light source, which mirror reflects a portion of the laser radiation that passed through the work area (4) such that this portion of the laser radiation (1) is at least partially returned to the work area.

5. The device according to claim 4, wherein the device has, in addition to the at least one first mirror, at least a second mirror (8, 9) arranged on the side of the work area (4) facing the laser light source and reflecting a portion of the laser radiation (1) reflected by the first mirror (6, 7) and having at least partially passed through the work area (4), such that this portion of the laser radiation (4) is at least partly returned to the work area (4).

6. The device according to claim 1, wherein at least one mirror (8, 9) is arranged only on the side of the work area (4) facing the laser light source, wherein the at least one mirror (8, 9) reflects a portion of the laser radiation (1) reflected in the work area (4) such that this portion of the laser radiation (4) is at least partly returned to the work area (4).

7. The device according to claim 1, wherein the plurality of the mirrors (6, 7, 8, 9) arranged on the same side of the work area (4) are inclined with respect to each other.

8. The device according to claim 1, wherein the at least one mirror (6, 7 8, 9) is curved.

9. The device according to claim 1, wherein the at least one mirror (6, 7, 8, 9) has an outer and/or an inner mirror surface.

10. The device according to claim 1, wherein the device comprises at least one polarization-selective beam splitter (21) reflecting the laser radiation (1*d*) into the work area (4).

11. The device according to claim 10, wherein the device comprises at least one polarization rotator (22) rotating the polarization direction of the laser radiation (1, 1*e*), before and/or after passage through the beam splitter (21).

12. The device according to claim 1, wherein the optical arrangement comprises at least one lens array arrangement (12, 13, 14, 15) which is arranged in the device such that the portion of the laser radiation (1) that has passed through work area (4) passes through the at least one lens array arrangement (12, 13, 14, 15) before being returned to the work area (4), wherein a decrease in the Rayleigh length of the focus range of the portion of the laser radiation (1) returned to the work area (4) is reduced or prevented by the at least one lens array arrangement (12, 13, 14, 15).

13. The device according to claim 1, wherein the at least one lens (3, 5), is a lens (3, 5) having a positive refractive power.

14. The device according to claim 1, wherein the at least one mirror (6, 7, 8, 9) has a parabolic or an elliptical cross section.

15. A device for applying laser radiation (1) to an at least partially reflective or transparent portion of a workpiece arranged in a work area (4), comprising:
   a laser light source for generating the laser radiation (1);
   an optical arrangement for influencing the laser radiation (1) such that the laser radiation (1) is focused to the work area (4);
   wherein the optical arrangement comprises at least one mirror (6, 7, 8, 9) reflecting a portion of the laser radiation (1) reflected in the work area (4) or a portion of the laser radiation (1) that has passed through the work area (4), such that this portion of the laser radiation (1) is at least partially returned to the work area, the optical arrangement further comprises at least one lens (3, 5) having a positive refractive power and being arranged between the work area (4) and the at least one mirror (6, 7, 8, 9); that the optical arrangement further comprises, in addition to the at least one lens (3, 5) at least one lens array arrangement (12, 13, 14, 15) which is arranged between the at least one lens (3, 5) and the at least one mirror (6, 7, 8, 9) such that the portion of the laser radiation (1) that has passed through the work area (4) passes through the at least one lens array arrangement (12, 13, 14, 15) before being returned to the work area (4), wherein a decrease in the Rayleigh length of the focus range of the portion of the laser radiation (1) returned to the work area (4) is reduced or prevented by the at least one lens array arrangement (12, 13, 14, 15).

16. A device for applying laser radiation (1) to an at least partially reflective or transparent portion of a workpiece arranged in a work area (4), comprising:

a laser light source for generating the laser radiation (1); and an optical arrangement for influencing the laser radiation (1) such that the laser radiation (1) is focused to the work area (4);

wherein the optical arrangement comprises at least one mirror (6, 7, 8, 9) reflecting a portion of the laser radiation (1) reflected in the work area (4) or a portion of the laser radiation (1) that has passed through the work area (4), such that this portion of the laser radiation (1) is at least partially returned to the work area, the optical arrangement comprises at least one lens (3, 5) having a positive refractive power and being arranged between the work area (4) and the at least one mirror (6, 7, 8, 9); that the optical arrangement further comprises, in addition to the at least one lens (3, 5) at least two lens array arrangements (12, 13, 14, 15) which are arranged between the at least one lens (3, 5) and the at least one mirror (6, 7, 8, 9) such that the portion of the laser radiation (1) that has passed through the work area (4) passes through the at least two lens array arrangements (12, 13, 14, 15) before being returned to the work area (4), wherein a decrease in the Rayleigh length of the focus range of the portion of the laser radiation (1) returned to the work area (4) is reduced or prevented by the at least two lens array arrangements (12, 13, 14, 15).

17. The device according to claim 7, wherein the plurality of the mirrors (6, 7, 8, 9) arranged on the same side of the work area (4) are inclined with respect to each other at angle of 90°.

18. The device according to claim 11, wherein the at least one polarization rotator (22) rotates the polarization direction of the laser radiation (1, 1e), before and/or after passage through the beam splitter (21), by 90°.

* * * * *

UNITED STATES PATENT AND TRADEMARK OFFICE
CERTIFICATE OF CORRECTION

PATENT NO. : 9,446,478 B2
APPLICATION NO. : 13/634915
DATED : September 20, 2016
INVENTOR(S) : Lisotschenko et al.

It is certified that error appears in the above-identified patent and that said Letters Patent is hereby corrected as shown below:

On the Title Page

Item (75) Inventors: change "Kolutushkin" to --Kolotushkin--.

Signed and Sealed this
Twenty-eighth Day of March, 2017

Michelle K. Lee
*Director of the United States Patent and Trademark Office*